(12) United States Patent
Binder et al.

(10) Patent No.: US 11,424,657 B2
(45) Date of Patent: Aug. 23, 2022

(54) SLIP RING BRIDGE, SLIP RING UNIT, ELECTRICAL MACHINE AND WIND POWER INSTALLATION

(71) Applicant: SIEMENS AKTIENGESELLSCHAFT, Munich (DE)

(72) Inventors: Herbert Binder, Neuburg (DE); Robert Gruber, Ruhstorf (DE); Oliver Memminger, Neuburg a. Inn (DE); Manuel Oberneder, Büchlberg (DE); Klaus Schifferer, Neuhaus am Inn (DE); Anatoli Vogel, Passau (DE); Roland Zeichfüssl, Ruhstorf a. d. Rott (DE)

(73) Assignee: FLENDER GMBH, Bocholt (DE)

( * ) Notice: Subject to any disclaimer, the term of this patent is extended or adjusted under 35 U.S.C. 154(b) by 353 days.

(21) Appl. No.: 16/545,804

(22) Filed: Aug. 20, 2019

(65) Prior Publication Data
US 2020/0067246 A1   Feb. 27, 2020

(30) Foreign Application Priority Data
Aug. 21, 2018   (EP) .................................... 18189977

(51) Int. Cl.
| | |
|---|---|
| *H02K 5/14* | (2006.01) |
| *H01R 39/08* | (2006.01) |
| *F03D 9/25* | (2016.01) |
| *F03D 80/80* | (2016.01) |
| *H02K 11/01* | (2016.01) |

(52) U.S. Cl.
CPC ............. *H02K 5/141* (2013.01); *F03D 9/25* (2016.05); *F03D 80/82* (2016.05); *H01R 39/08* (2013.01); *H02K 11/012* (2020.08)

(58) Field of Classification Search
CPC ............ H01R 39/08; F03D 9/25; F03D 80/82
USPC ..................................... 290/44, 55; 310/232
See application file for complete search history.

(56) References Cited

U.S. PATENT DOCUMENTS

| | | | | |
|---|---|---|---|---|
| 3,905,664 A | | 9/1975 | Baldoni | |
| 3,940,199 A | * | 2/1976 | Ecklund | G01K 7/023 |
| | | | | 439/28 |
| 5,054,189 A | * | 10/1991 | Bowman | H01R 43/10 |
| | | | | 29/597 |
| 5,285,125 A | * | 2/1994 | Lang | H02K 17/22 |
| | | | | 310/232 |
| 5,773,906 A | * | 6/1998 | Mukai | H02K 5/141 |
| | | | | 310/232 |
| 6,084,331 A | * | 7/2000 | Reinhardt | H02K 5/141 |
| | | | | 310/239 |

(Continued)

FOREIGN PATENT DOCUMENTS

| | | | | |
|---|---|---|---|---|
| CA | 2982666 A1 | * 10/2016 | ............. | H01R 39/08 |
| CN | 201178359 Y | 1/2009 | | |

(Continued)

*Primary Examiner* — Charles Reid, Jr.
(74) *Attorney, Agent, or Firm* — Henry M. Feiereisen LLC (57) ABSTRACT

A slip ring bridge, in particular for use in a wind power installation, includes at least two segments configured to provide electrical power, and an insulation element configured to insulate the segments to maintain the segments in spaced-apart relationship. The insulation element includes a shield arranged inside the insulation element and connected to a constant electric potential.

17 Claims, 4 Drawing Sheets

(56) References Cited

U.S. PATENT DOCUMENTS

| | | | | |
|---|---|---|---|---|
| 6,400,057 B2* | 6/2002 | Vesper | H01R 39/085 | 310/232 |
| 7,915,782 B2* | 3/2011 | Hofei | H02K 15/0006 | 310/228 |
| 9,240,660 B1* | 1/2016 | Arceneaux | H01R 39/08 | |
| 2003/0111928 A1* | 6/2003 | Bowman | H01R 39/08 | 310/232 |
| 2004/0119369 A1* | 6/2004 | Radtke | H01R 39/64 | 310/232 |
| 2009/0091208 A1* | 4/2009 | Yu | H01R 39/08 | 310/232 |
| 2011/0210644 A1* | 9/2011 | Krogh | H01R 39/08 | 310/232 |
| 2015/0311772 A1* | 10/2015 | Tominaga | H01R 39/34 | 310/232 |
| 2016/0028199 A1* | 1/2016 | Gerdes | F03D 80/82 | 290/55 |
| 2016/0061187 A1* | 3/2016 | Aranovich | F03D 15/05 | 290/55 |
| 2017/0012505 A1* | 1/2017 | Holzapfel | H01R 39/46 | |
| 2018/0080434 A1* | 3/2018 | Carr | F03D 7/0272 | |
| 2018/0205297 A1* | 7/2018 | Toledo | H02K 17/24 | |
| 2019/0093633 A1* | 3/2019 | Peter | H01R 39/08 | |

FOREIGN PATENT DOCUMENTS

| | | |
|---|---|---|
| CN | 202856512 U | 4/2013 |
| CN | 107968304 A | 4/2018 |
| CN | 106067704 B | 8/2018 |
| DE | 100 03 900 A1 | 5/2002 |

\* cited by examiner

SLIP RING BRIDGE, SLIP RING UNIT, ELECTRICAL MACHINE AND WIND POWER INSTALLATION

CROSS-REFERENCES TO RELATED APPLICATIONS

This application claims the priority of European Patent Application, Serial No. EP18189977.4, filed Aug. 21, 2018, pursuant to 35 U.S.C. 119(a)-(d), the disclosure of which is incorporated herein by reference in its entirety as if fully set forth herein.

BACKGROUND OF THE INVENTION

The present invention relates to a slip ring bridge, to a slip ring unit, to an electrical machine and to a wind power installation.

The following discussion of related art is provided to assist the reader in understanding the advantages of the invention, and is not to be construed as an admission that this related art is prior art to this invention.

A slip ring unit generally includes a slip ring bridge as a stationary element and a slip ring as a rotatable element, and is provided to transmit electrical power from the stationary element, e.g. a stator of an electrical machine, to the rotatable element, e.g. a rotor of an electrical machine. The electrical power can hereby be transmitted to the rotatable slip ring by slip ring brushes which are each connected to a segment of the slip ring bridge.

A problem associated with transmitting high electrical power and/or high voltages arises with the electrical insulation. High potential differences between the individual current-carrying segments are encountered particularly when transmitting a polyphase AC current or a polyphase AC voltage. The high potential differences lead to uncontrolled discharges or to uncontrollable electrical flashovers. One approach to improve insulation against uncontrolled discharges of this kind or against uncontrolled electrical flashovers involves an increase in the dimensions of slip ring units, in particular brush bridges. By increasing the size of the brush bridge, the distances between the segments become larger and the risk of uncontrolled charge exchange becomes lower. However, increased dimensions are disadvantageous particularly when the slip ring units are used in wind power installations due to the limited space available in a nacelle of the wind power installation.

It would therefore be desirable and advantageous to obviate prior art shortcomings and to reliably prevent uncontrolled charge equalization when transmitting electrical power, without increasing the dimensions of a slip ring unit, in particular the brush bridge.

SUMMARY OF THE INVENTION

According to one aspect of the present invention, a slip ring bridge, in particular for use in a wind power installation, includes at least two segments configured to provide electrical power, and an insulation element configured to insulate the segments to maintain the segments in spaced-apart relationship, the insulation element including a shield arranged inside the insulation element and connected to a constant electric potential.

The present invention resolves prior art problems by recognizing that effective insulation of the segments in relation to one another is necessary for insulating the individual segments of the slip ring bridge, in particular a brush bridge. This is realized in accordance with the present invention by so-called insulation elements which insulate the segments from one another. Moreover, the insulation elements assist in holding the segments of the slip ring bridge together.

A slip ring bridge in accordance with the present invention advantageously has a plurality of segments.

According to another advantageous feature of the present invention, the insulation element can be guided through openings of the segments for connection to the segments, with an electric potential being applied to the segments. The insulation elements and the segments advantageously form a framework of the slip ring bridge. Advantageously, the openings are each arranged at a same point of the segment. Advantageously, provision may be made for a spacer positioned between the segments, with the spacer having embossed portions. Thus, the distance between two segments can be kept constant by spacers. Advantageously, the insulation element can have a cylindrical configuration.

According to another advantageous feature of the present invention, the insulation element can include a pin and an inner insulating layer, with the inner insulating layer insulating the pin from the shield. The pin can be made substantially of metal and improves mechanical stability.

The metal pin and an inner lateral surface of the respective opening of the segment form an electrical capacitance. The electrical capacitance can lead to a reduction in the insulation between the segments, particularly when transmitting an alternating current. In order to reduce the capacitance, a shield is advantageously positioned between the pin and the lateral surface of the opening. The shield is advantageously realized as a metal layer between the lateral surface of the pin and the lateral surface of the opening which surrounds the pin. The shield is generally insulated both from the pin and also from the current-carrying segment.

The shield is advantageously connected to a constant electric potential, by way of example by a connection to ground. The shield can dissipate charges by way of the electrical connection.

Creepage currents on the outer sides of the respective insulation element may also be problematical when insulating the segments (which are usually formed from metal). Creepage currents can form between the segments particularly due to the deposition of dust on the outer side of the slip ring bridge. Spacers can be arranged around the insulation elements and between the segments for improved stability of the segments in relation to one another.

Accordingly, uncontrolled charge transfers between the segments can be further minimized by way of the surface of the respective insulation element or of the respective spacer being increased in size. The surface can be increased in size by embossed portions (convex surface) or by an imprinted portion (concave surface). A ribbed shape advantageously serves for extending the creepage distance and therefore for improving the insulation. An extension in the creepage distance can be formed by embossed portions which run around the lateral surface of the spacer.

A slip ring bridge in accordance with the present invention can find application, in particular, in a wind power installation. The segments can advantageously be formed from metal. The segments can have a structure which is in the form of an annular segment. The segments advantageously have openings for passage of the insulation segments, with the insulation elements and the segments advantageously forming a framework of the slip ring bridge.

The insulation element can be produced from an electrical insulator, such as a plastic, a composite material or a ceramic. The insulation segment is suitably of cylindrical design. The insulation segment includes a shield in the interior. The shield may likewise be of cylindrically symmetrical design.

The segments can have openings at respectively same points for passage of the respective insulation elements. The lateral surface of the respective opening suitably makes contact with the lateral surface of the insulation element.

The slip ring brushes are advantageously each electrically connected to the segment.

The electrical power can be provided by a polyphase AC voltage, in particular a three-phase AC voltage.

The shield can be formed by a metal foil and can advantageously used for shielding the pin which is preferably formed from metal. The pin together with spacers secures the structure of the slip ring bridge.

The segments can be positioned substantially in parallel. The insulation of the segments against uncontrolled charge transfers is improved particularly by the shield. As a result of the improved insulation, a slip ring bridge in accordance with the present invention can be designed in a particularly compact manner. Large electrical powers can be exchanged with the aid of such a compact slip ring bridge with slip ring.

According to another advantageous feature of the present invention, the insulation element can be connected to the respective segment, with the insulation element being guided through openings at least of those segments to which an electric potential is applied. The opening may include a cutout on a side of the segment which is suitable for receiving the insulation element.

A slip ring bridge according to the present invention may advantageously include current-carrying segments, which are designed for providing a polyphase AC voltage, and also grounded segments which are connected to a constant potential. The grounded segments may advantageously be positioned on the respective outer sides of the slip ring bridge.

The insulation segments may be fastened with grounded segments, e.g. by a screw connection.

A slip ring bridge according to the present invention is particularly stable as a result of the afore-described construction.

According to another advantageous feature of the present invention, the insulation element can include an outer insulating layer configured to insulate the shield from the segments which provide the electrical power. The insulation segment can hereby be constructed around a pin. The inner insulating layer can be configured as a hollow cylinder and may include the shield on its outer lateral surface. The outer insulating layer may hereby insulate the shield from the segments, in particular the lateral surface of the respective opening of the segment. The outer insulating layer accordingly forms the outer lateral surface of the insulation element.

An electrical contact between the grounded segment advantageously serves for applying a constant electric potential to the shield. Charges which are induced in the shield can be compensated for by the connection of the shield to ground. The segments are particularly effectively insulated from one another owing to the above-described construction of the insulation segment.

According to another advantageous feature of the present invention, the insulation element can include a pin and an inner insulating layer, said inner insulating layer insulating the pin from the shield. Both, the inner insulating layer and the outer insulating layer can be formed from plastic. The pin is advantageously formed from a solid material, such as a metal. This is possible, as the pin is insulated from the shield by way of the inner insulating layer, so that the electrical conductivity of the metal does not lead to electrical connection of the segments to one another. In this way, the slip ring bridge is particularly stable.

According to another advantageous feature of the present invention, spacers can be positioned between the segments, with the spacers having embossed portions. The spacers can be configured as hollow cylinders. The side faces of the spacer each lie on the segment. The inner lateral surface advantageously encloses the insulation element at least in regions. The embossed portion is suitably applied to the outer lateral surface of the spacer and is provided to suppress creepage current. Suitably, the embossed portion is formed around the lateral surface. The spacer improves insulation of the segments in relation to one another. Furthermore, the embossed portion protects an electrically conductive connection by electrically conductive particles.

According to another advantageous feature of the present invention, the shield can be connected to ground. As a result, induced charge carriers can advantageously be dissipated on the surface of the shield.

According to another advantageous feature of the present invention, the pin can be made substantially of metal. As a result, a particularly secure and stable connection of the (insulation) segments of the slip ring bridge can be realized.

According to another advantageous feature of the present invention, holding apparatuses can be fastened to the segments, respectively, each said holding apparatus securing a slip ring brush and providing an electrical connection between the segment and the slip ring brush. The slip ring brushes can be electrically connected to the respectively associated segment. The holding apparatuses can be connected to the respectively associated segments by a screw connection. The holding apparatus may advantageously be formed, at least partially, from electrical material, e.g. aluminum, bronze, stainless steel, copper or from brass. Electric current can be particularly easily transmitted to the respective slip ring brush in the holding apparatus owing to the electrically conductive holding apparatus.

A slip ring bridge according to the present invention can be configured for transmitting an electrical power of at least 100 kilowatts, in particular of at least one megawatt. Currently preferred is a transmission of electrical power of 5 megawatts. A slip ring bridge according to the present invention can find application in power plant technology or for powerful industrial installations, in particular for heavy industry. Furthermore, the invention can advantageously be used for marine propulsion systems.

According to another advantageous feature of the present invention, the slip ring bridge can include at least four segments, with one phase of a three-phase AC voltage being applied to three of the four segments and a constant electric potential being applied to a fourth one of the four segments.

Advantageously, the slip ring bridge can have six segments.

The segments which are respectively positioned on a front side and on a rear side of the slip ring bridge are suitably not connected to an electric potential which changes over time. The segments stabilize the slip ring bridge and are not intended for transmitting electrical power. The fourth one of the four segments provides a connection to ground for the slip ring.

The segments on the front side and the rear side of the slip ring bridge shield the slip ring bridge in an axial direction. Of the four segments which are arranged therebetween, three of the segments serve for transmitting a three-phase AC voltage. The fourth segment serves for connecting the slip ring to ground, i.e. slip ring brushes act on the slip ring without an electrical power being transmitted.

Transmission of a three-phase AC voltage and connection of the slip ring to ground with a particularly compact construction is possible owing to a construction of the slip ring brush with at least four segments. Further segments are intended for shielding the slip ring bridge.

According to another aspect of the present invention, a slip ring unit includes a slip ring, a slip ring bridge including at least two segments configured to provide electrical power, in particular in the form of a three-phase AC voltage, and an insulation element configured to insulate the segments to maintain the segments in spaced-apart relationship, the insulation element including a shield arranged inside the insulation element and connected to a constant electric potential, and a slip ring brush held by the slip ring bridge for transmitting the electrical power to the slip ring.

The slip ring brushes, which are associated with the segments, respectively, transmit the electrical power from/to one contact area of the slip ring. The respective contact area of the slip ring is positioned on the lateral surface of the slip ring. The slip ring can be rotatably mounted. The electrical voltage or the electric current which is provided/received by the respective slip ring brush is received/provided by the contact area. The respective contact area is suitably positioned on the lateral surface of the slip ring. The slip ring is advantageously associated with a rotor.

According to still another aspect of the present invention, an electrical machine, in particular a generator for a wind power installation, includes a slip ring bridge which includes at least two segments configured to provide electrical power, and an insulation element configured to insulate the segments to maintain the segments in spaced-apart relationship, said insulation element including a shield arranged inside the insulation element and connected to a constant electric potential. An electrical machine according to the present invention can be configured as a separately excited electrical machine.

The electrical power, which is transmitted to and/or fro from a stationary element, in particular a stator, to the rotor with the aid of the slip ring brush described here can be transmitted in a particularly reliable manner with the aid of the invention described here.

According to still another aspect of the present invention, a wind power installation includes a slip ring bridge as described above and/or a slip ring unit as described above. Electrical power can be transmitted with the aid of a slip ring bridge of particularly compact design owing to the invention described here.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
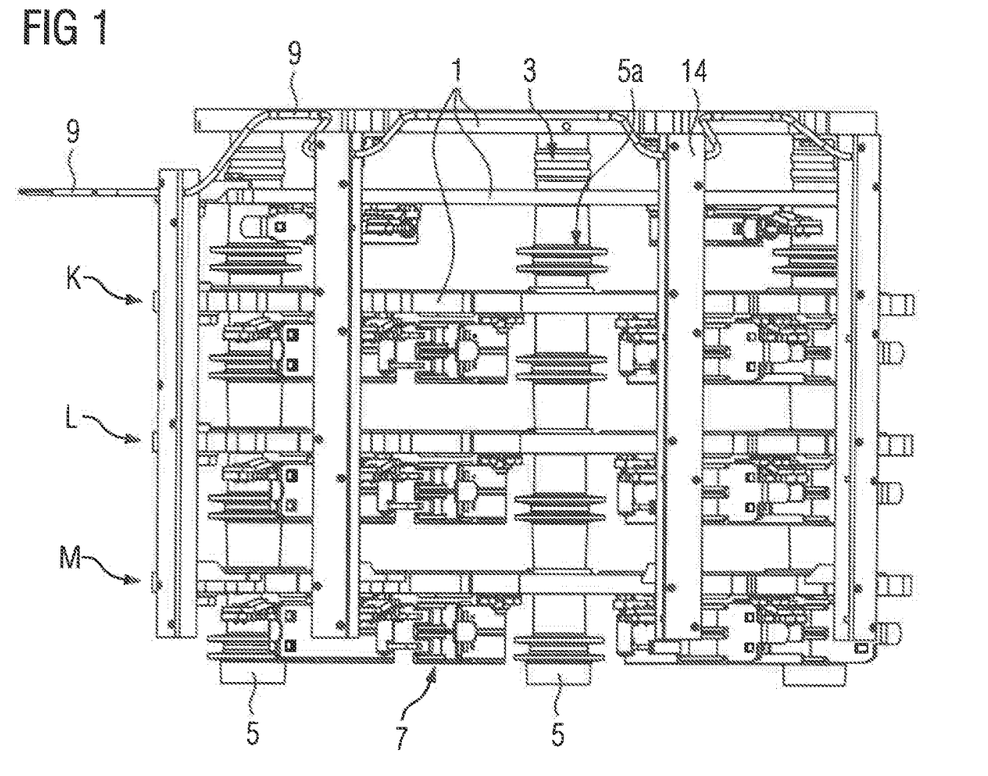
FIG. 1 is a schematic illustration of an exemplary slip ring brush according to the present invention.

Turning now to the drawing, and in particular to FIG. 1, there is shown a schematic illustration of an exemplary slip ring brush according to the present invention. The slip ring bridge includes segments 1 which are arranged in spaced-apart parallel relationship. The segments 1 are connected by insulation elements 3. Holding apparatuses 7 are respectively associated with the segments 1 to receive slip ring brushes 12 (not shown here for reasons of clarity but shown in FIG. 3).

The insulation elements 3 include spacers 5 which are advantageously of cylindrical design, Electrical power is applied to the respective segment 1 by way of an electrical connection. The electrical power can be transmitted to a slip ring with the aid of the slip ring brushes 12. Each of the insulation elements 3 is surrounded by individual spacers 5. The spacers 5 are each positioned between the segments 1 to maintain the segments 1 in spaced-apart relation.

A contact guide 14 feeds the electrical power to the respective segment 1. The contact guide 14 is advantageously inserted in a cable shaft 9. The cable shaft 9 is suitably oriented parallel in relation to the insulation elements 3.

The segments 1 are connected by three insulation elements 3, The segments 1 are preferably produced from a metal sheet. The segments 1 have a thickness of approximately 2 to 8 millimeters. The segments 1 are designed substantially in the form of an annular segment. The respective side of the segment 1 can hereby form an angle of between 150 degrees and 220 degrees.

Three of the segments 1 are intended to transmit a phase K, L, M of a three-phase AC voltage. A fourth segment 1 is intended to provide a constant electric potential (ground) for a slip ring 11.

The respective cable shaft 9 serves for guiding the contact guide 14. Here, the contact guide 14 is understood to be the feed of the electrical contacts.

Figure 2:
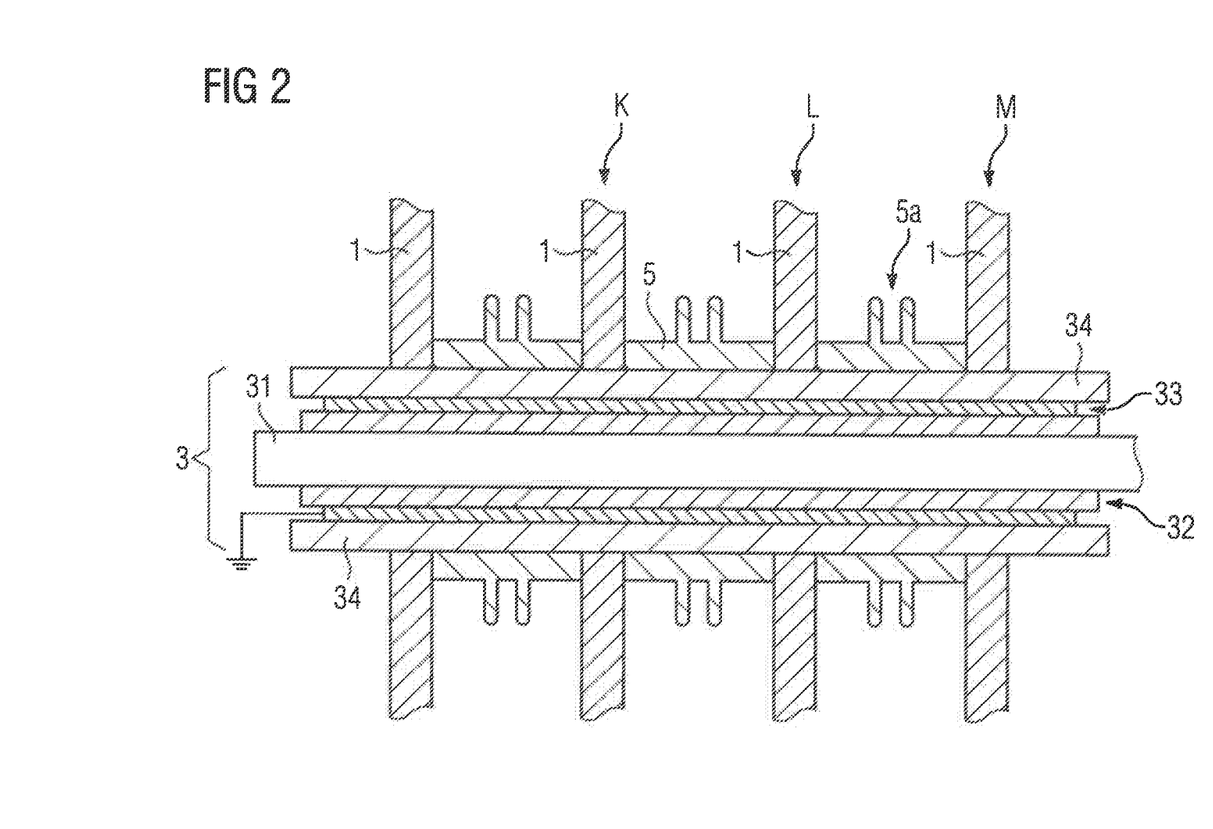
FIG. 2 is a schematic detailed view of an exemplary slip ring brush according to the present invention.

FIG. 2 shows a detail of an exemplary slip ring bridge. The insulation element 3 includes a pin 31. The pin 31 is preferably formed from a metal of high strength and low weight, for example aluminum or stainless steel. The pin 31 is surrounded by an inner insulating layer 32. The inner insulating layer 32 is preferably designed as a plastic pipe. The inner insulating layer 32 serves as a base for a shield 33. The shield 33 is preferably designed as a metal foil, in particular as an aluminum foil or as a copper foil. The shield 33 covers the outer lateral surface of the inner insulating layer 32 at least in regions. The shield 33 is encompassed by an outer insulating layer 34.

The outer insulating layer 34 is preferably designed as a plastic pipe. The outer insulating layer 34 leads through the respective opening of the segments 1. The segments 1 are preferably designed as metal plates. Spacers 5 are positioned around the outer insulating layer 34 in order to space apart the segments 1 from one another. The spacers 5 each have embossed portions 5a. The embossed portions 5a serve for reducing creepage currents. The segments 1 are insulated from one another in an improved manner owing to the spacers 5.

Here, the shield 33 is connected to a constant electric potential. The shield 33 is preferably connected to ground. The connection to ground is preferably made by an electrical contact 34a of the shield 33 with a grounded segment 1.

Figure 3:
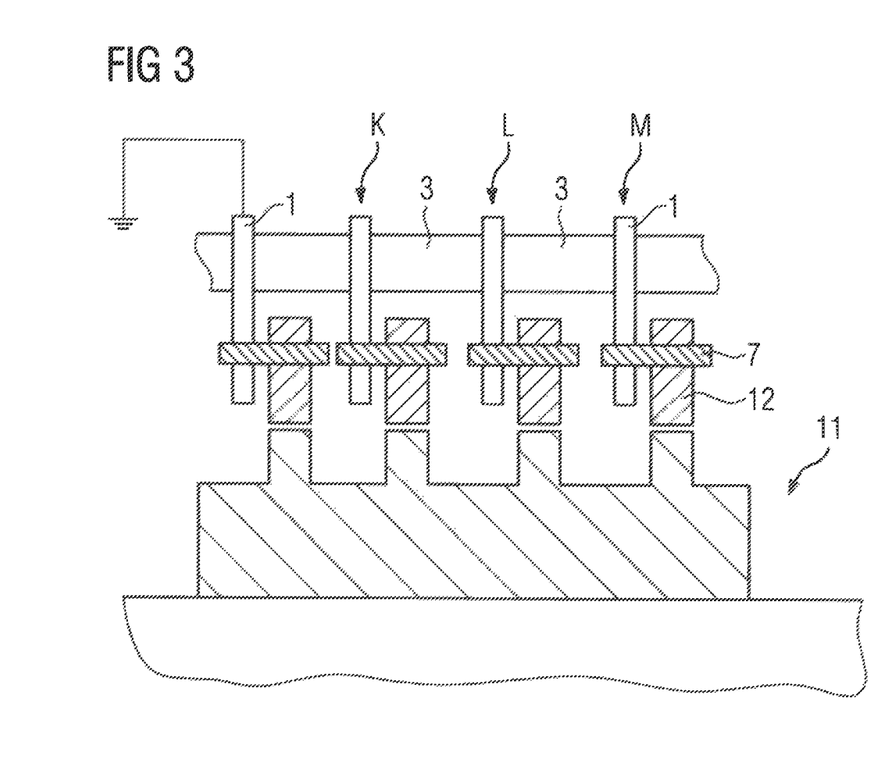
FIG. 3 is a sectional view of a slip ring unit according to the present invention.

FIG. 3 shows a section through a slip ring unit. The slip ring unit includes a slip ring 11 and the slip ring bridge. The slip ring bridge has four segments 1, wherein three of the segments 1 are designed for providing a three-phase AC voltage. Here, the respective segment serves for providing a phase K, L, M. A fourth (grounded) segment 1 is connected to ground potential. The respective segment 1 is electrically connected to a slip ring brush 12 with the aid of a holding apparatus 7. The slip ring brush 12 provides the respective phase K, L, M of the three-phase AC voltage to the slip ring 11. A further segment 1 provides the constant electric potential (ground potential) for the slip ring 11 by means of a slip ring brush 12. The slip ring 11 is rotatably mounted and receives the three-phase AC voltage and also ground potential.

Figure 4:
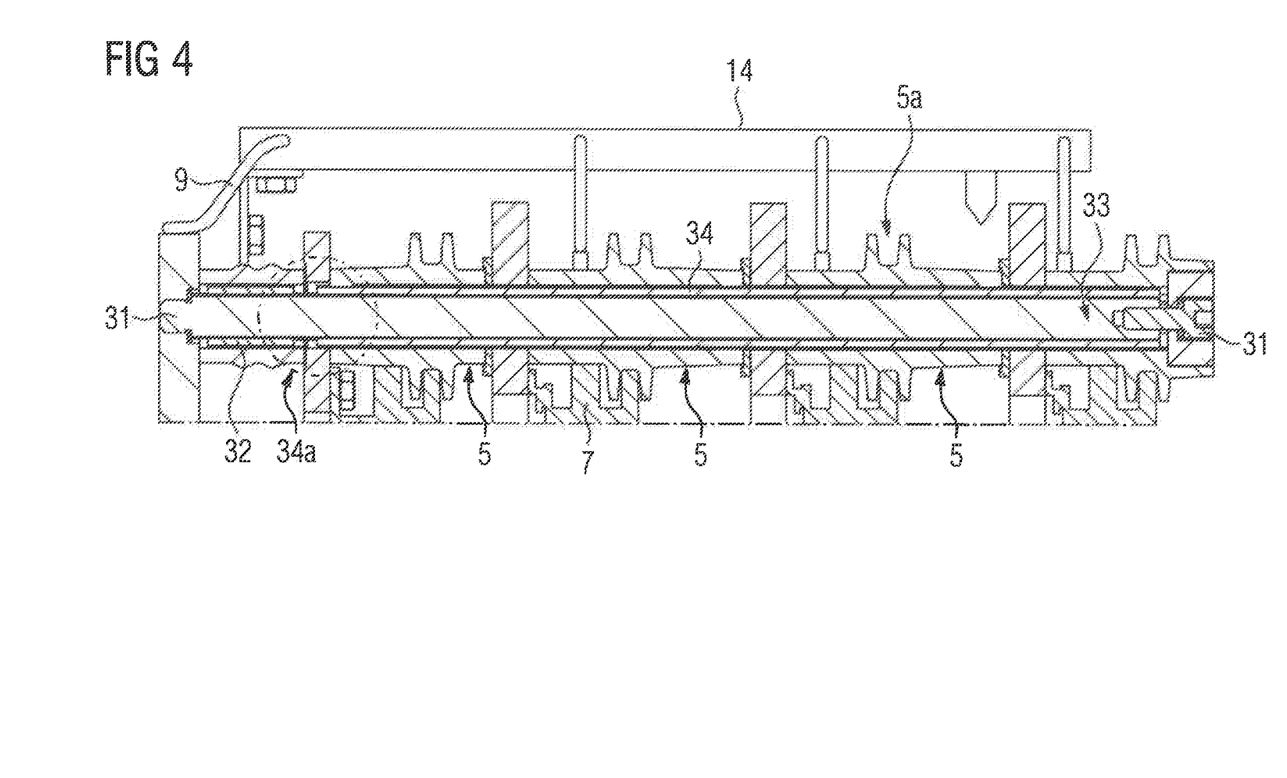
FIG. 4 is a sectional view of an exemplary slip ring brush according to the present invention.

FIG. 4 shows a section through an exemplary slip ring bridge. The slip ring bridge includes four segments 1, wherein the segments are designed for providing the three-phase AC voltage and the constant electric potential.

The respective segment 1 is manufactured from an electrically conductive material, for example stainless steel, bronze, copper or aluminum.

The respective segment 1 has openings for passage of the insulation elements 3. The openings of the segments 1 have a diameter which is designed to be so large that an outer insulating layer 34 can be passed through.

Holding apparatuses 7 are respectively fastened to the segments 1 for receiving slip ring brushes 12. The respective segment 1 is connected to a contact guide 14, here positioned in a cable shaft 9. The contact guide 14 serves for providing the respective phase K, L, M of the three-phase AC voltage and therefore for providing the electrical power.

The segments 1 are connected by an insulation element 3 such that they are spaced apart from one another. The insulation element 3 includes, in its center, a pin 31. The pin 31 has a thread at one end, so that the pin 31 can be fastened with a (non-current-carrying) segment 1. The segment 1, which is connected to the pin 31 by the screw connection, does not provide electrical power but rather is intended to in particular provide improved stability of the slip ring bridge. An inner insulating layer 32 is arranged around the lateral surface of the pin 31. The inner insulating layer 32 serves for insulating the pin 31 with respect to the segments 1 which are provided for providing the electrical power.

The inner insulating layer 32 is designed as a carrier for the shield 33. The shield 33 is preferably arranged, as a metal layer, between the inner insulating layer 32 and the outer insulating layer 34.

The outer insulating layer 34 is positioned between the opening of the respective segment 1 and the shield 33. The outer insulating layer 34 serves for insulating the shield 33 from the respective segment 1.

Spacers 5 are preferably positioned around the outer insulating layer 34 and in each case between the segments 1. The spacers 5 serve for providing improved insulation of the segments 1 from one another. Moreover, the spacers 5 serve for providing improved stability of the segments 1 in the slip ring bridge. Here, the segments 1 act on side faces of the respective spacer 5.

The shield is electrically connected to the grounded segment 1 by an electrical contact 34a. The grounded segment 1 has a constant electric potential. The outer insulating layer 34 is preferably interrupted at least in regions in the region of the electrical contact 34a.

The interruption of the outer insulating layer 34 serves for realizing electrical contact between the segment 1 and the shield 33.

In summary, the present invention relates to a slip ring bridge and to a slip ring unit and also to an electrical machine and a wind power installation which include such a slip ring bridge, respectively. The slip ring bridge includes segments which are preferably designed as metal plates which are shaped in the form of an annular segment. The segments serve for providing and for fastening slip ring brushes 12 which are each positioned in holding apparatuses 7. The segments 1 are connected to one another in parallel by insulation elements 3. The insulating elements 3 have a shield 33 in their interior, wherein the shield 33 is insulated with respect to the segments 1. The shield 33 is connected to a constant electric potential. The insulation of the segments 33 from one another to prevent uncontrolled charge exchange can be improved with the aid of the shield 33. In order to further improve the insulation, spacers 5 are positioned between the segments 1, wherein the spacers 5 are preferably arranged around the insulating elements 3 and preferably have embossed portions 5a for extending the creepage distance.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A slip ring bridge, in particular for use in a wind power installation, said slip ring bridge comprising:
   at least two segments configured to provide electrical power; and
   an insulation element configured to insulate the segments to maintain the segments in spaced-apart relationship, said insulation element including an electrically conducting shield arranged inside the insulation element and connected to a constant electric potential.

2. The slip ring bridge of claim 1, further comprising a slip ring brush to aid in a transmission of the electric power.

3. The slip ring bridge of claim 1, wherein the insulation element is guided through openings of the segments for connection to the segments, with an electric potential being applied to the segments.

4. The slip ring bridge of claim 1, wherein the insulation element includes an outer insulating layer configured to insulate the shield from the segments.

5. The slip ring bridge of claim 1, wherein the at least two segments and the insulation element are connected by a pin extending through the at least two segments and the insulation element and the insulation element comprises an inner insulating layer, said inner insulating layer insulating the pin from the shield.

6. The slip ring bridge of claim 5, wherein the pin is made substantially of metal.

7. The slip ring bridge of claim 1, further comprising a spacer positioned between the segments, said spacer having embossed portions.

8. The slip ring bridge of claim 1, wherein the shield is connected to ground.

9. The slip ring bridge of claim 1, further comprising holding apparatuses fastened to the segments, respectively, each said holding apparatus securing a slip ring brush and providing an electrical connection between the segment and the slip ring brush.

10. The slip ring bridge of claim 1, wherein the slip ring bridge is configured for transmitting an electrical power of at least 100 kilowatts.

11. The slip ring bridge of claim 1, further comprising at least two more of said segments, with one phase of a three-phase AC voltage being applied to three of the four segments and the constant electric potential being applied to a fourth one of the four segments.

12. A wind power installation, comprising a slip ring bridge as set forth in claim 1.

13. The slip ring bridge of claim 1, wherein the slip ring bridge is configured for transmitting an electrical power of at least one megawatt.

14. The slip ring bridge of claim 1, wherein the slip ring bridge is configured for transmitting an electrical power of at least 5 megawatts.

15. A slip ring unit, comprising:
a slip ring;
a slip ring bridge including at least two segments configured to provide electrical power, and an insulation element configured to insulate the segments to maintain the segments in spaced-apart relationship, said insulation element including an electrically conducting shield arranged inside the insulation element and connected to a constant electric potential; and
a slip ring brush held by the slip ring bridge for transmitting the electrical power to the slip ring.

16. The slip ring unit of claim 15, wherein the at least two segments provide the electric power in the form of a three-phase AC voltage.

17. An electrical machine, in particular a generator for a wind power installation, said electrical machine comprising a slip ring bridge, said slip ring bridge comprising at least two segments configured to provide electrical power, and an insulation element configured to insulate the segments to maintain the segments in spaced-apart relationship, said insulation element including an electrically conducting shield arrange inside the insulation element and connected to a constant electric potential.

* * * * *